No. 748,216. PATENTED DEC. 29, 1903.
A. C. E. RATEAU & G. SAUTTER.
MULTICELLULAR TURBINE.
APPLICATION FILED AUG. 1, 1901.
NO MODEL. 5 SHEETS—SHEET 3.
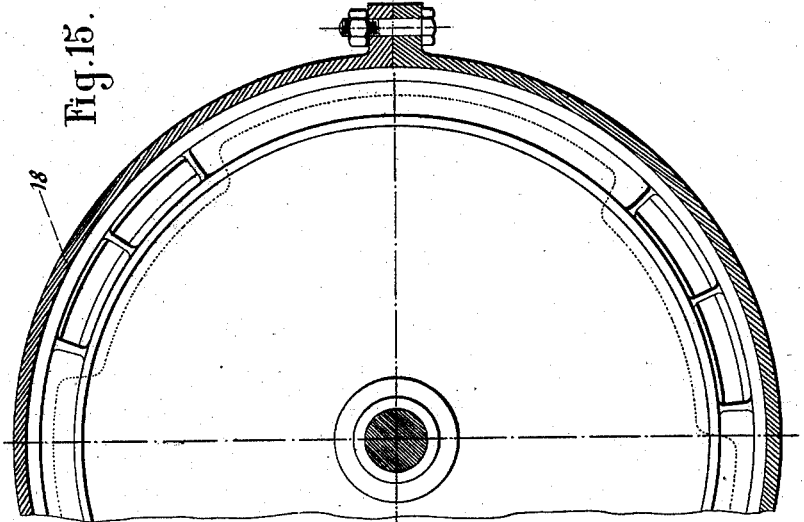
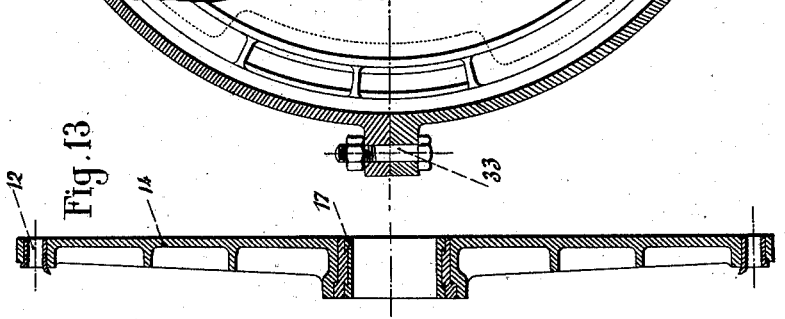
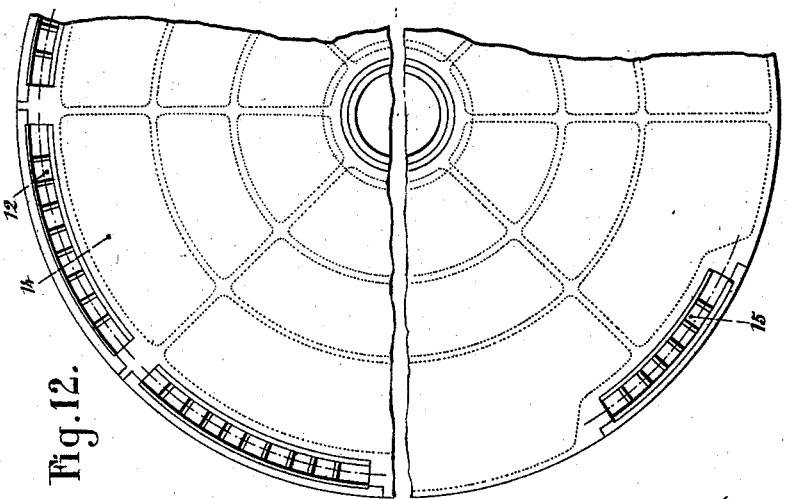

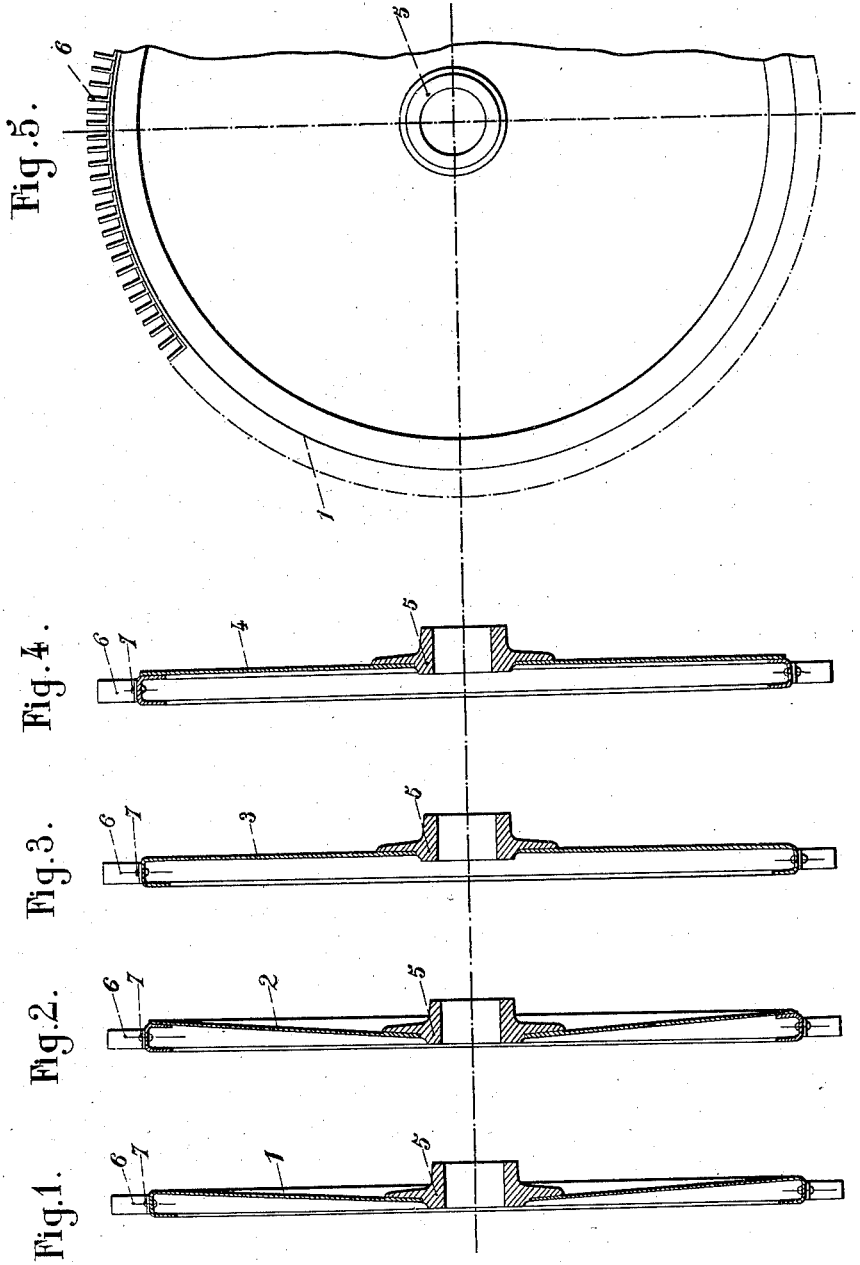

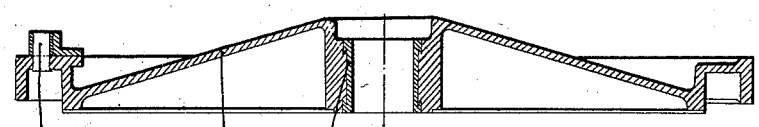
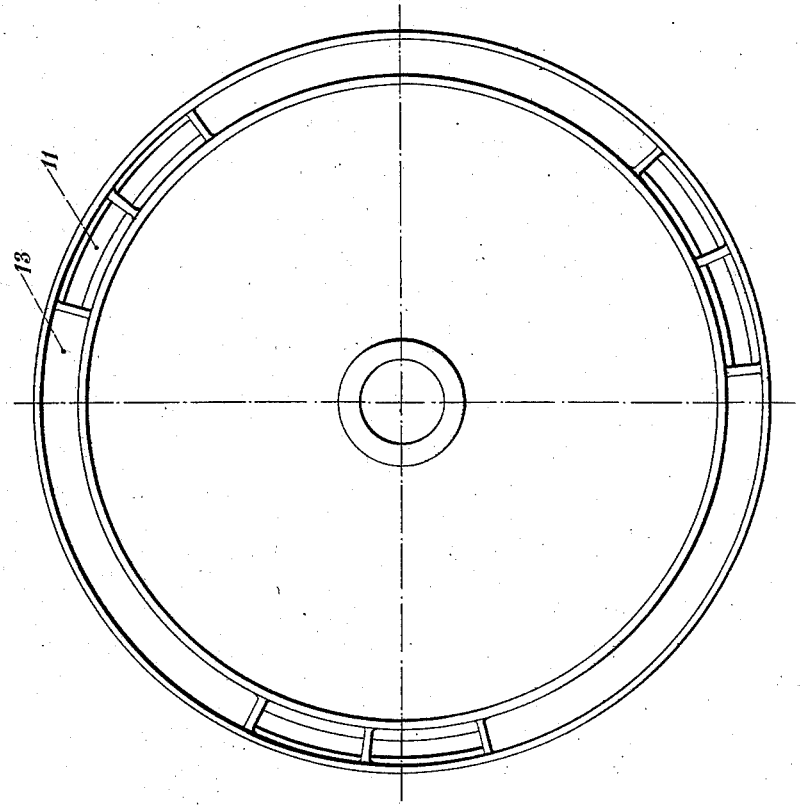
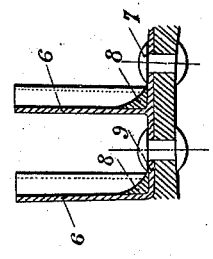
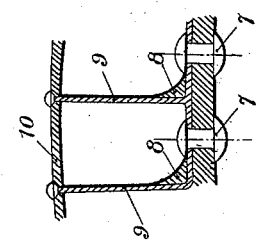
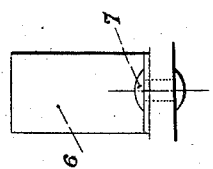
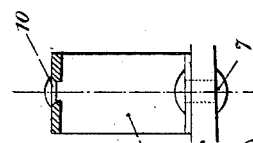

No. 748,216. PATENTED DEC. 29, 1903.
A. C. E. RATEAU & G. SAUTTER.
MULTICELLULAR TURBINE.
APPLICATION FILED AUG. 1, 1901.
NO MODEL. 5 SHEETS—SHEET 4.
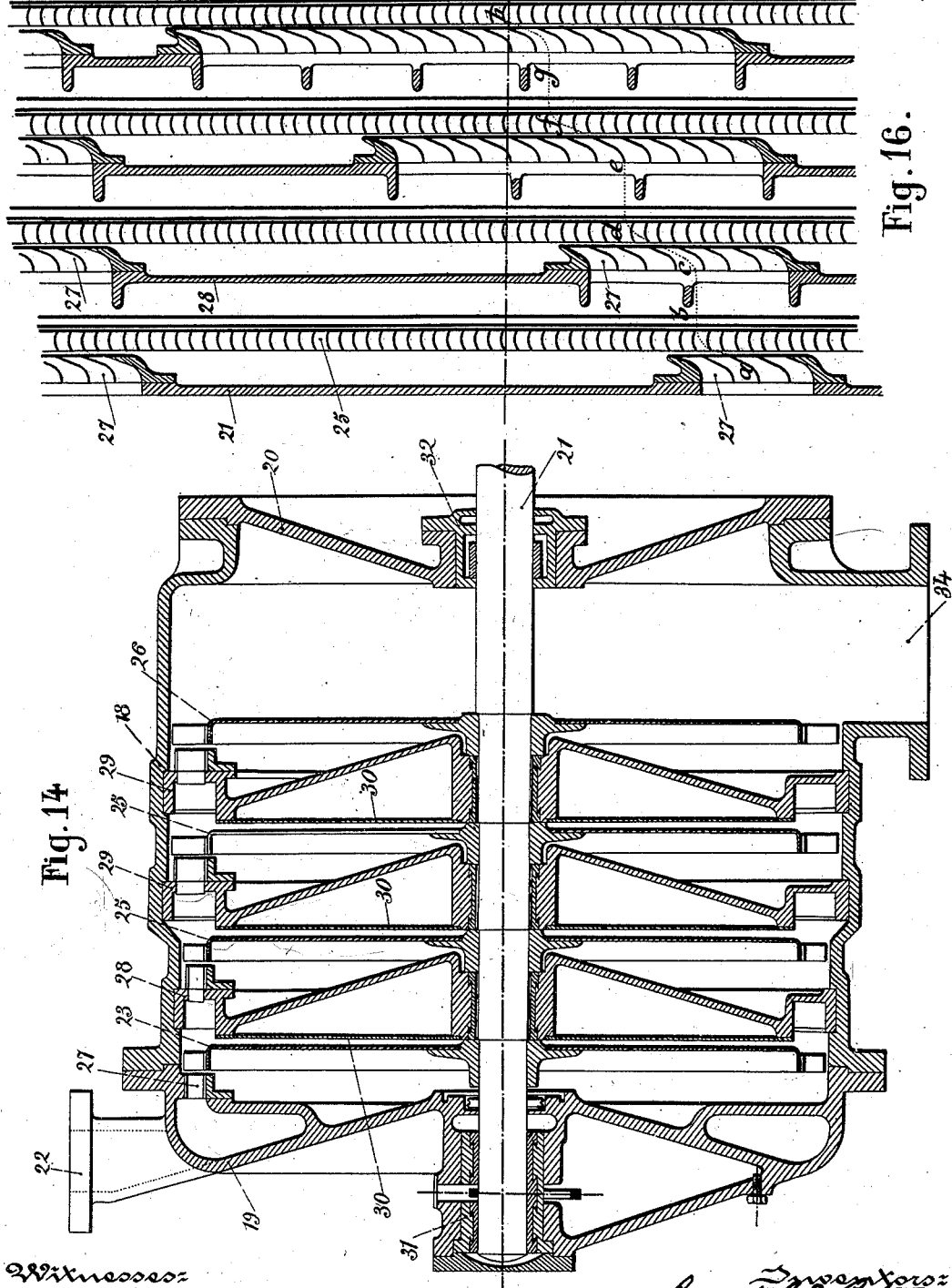

No. 748,216. PATENTED DEC. 29, 1903.
A. C. E. RATEAU & G. SAUTTER.
MULTICELLULAR TURBINE.
APPLICATION FILED AUG. 1, 1901.
NO MODEL. 5 SHEETS—SHEET 5.
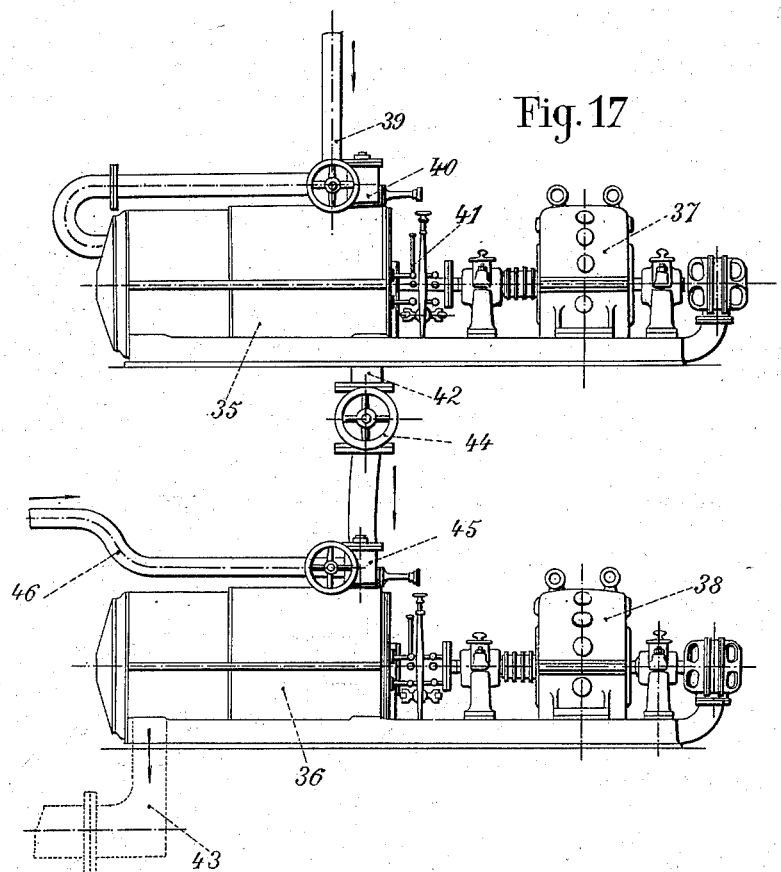
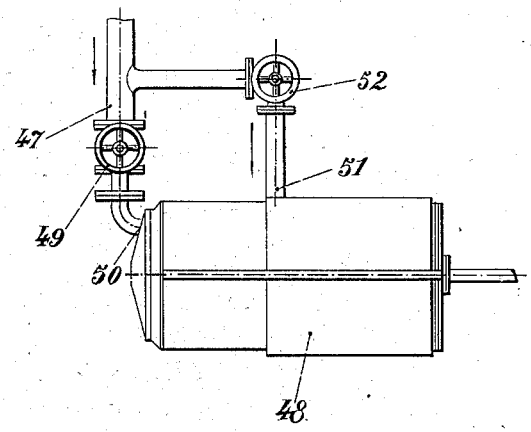

No. 748,216. Patented December 29, 1903.

UNITED STATES PATENT OFFICE.

AUGUSTE CAMILLE EDMOND RATEAU AND GASTON SAUTTER, OF PARIS, FRANCE.

MULTICELLULAR TURBINE.

SPECIFICATION forming part of Letters Patent No. 748,216, dated December 29, 1903.

Application filed August 1, 1901. Serial No. 70,438. (No model.)

*To all whom it may concern:*

Be it known that we, AUGUSTE CAMILLE EDMOND RATEAU and GASTON SAUTTER, citizens of the Republic of France, and residents of Paris, France, have jointly invented certain new and useful Improvements in Multicellular Turbines, of which the following is a specification.

This invention has for its object to construct a special type of turbine driven by direct action of steam or gas.

Direct-action turbines differ in a well-defined manner from reaction-turbines.

In direct-action turbines the driving fluid is projected by the distributer onto the wheel with a speed which corresponds to the whole pressure that this wheel utilizes. The absolute pressure of fluid therefore is the same on the inlet and outlet sides of the moving paddle-blades. There is therefore no difference of pressure on the two faces of the moving wheel, which thus receives no longitudinal thrust from the fluid.

In reaction-turbines, on the contrary, a portion only of the pressure utilized by the moving wheel is transformed into speed in passing from the distributer. The remainder of the pressure, generally one-half, is used up in the moving wheel. This latter is therefore subjected to pressures which decrease from the inlet to and outlet from the paddle-blades. The two faces of the moving wheel are therefore subject to a difference of pressure.

Steam-turbines having multiple wheels hitherto constructed—in particular, Parson's turbine—are reaction-turbines. They have several defects, more especially the following:

First. With the same fall of pressure under the same conditions the reaction-turbine rotates faster than the direct-action turbine. If, in so far as concerns hydraulic tubines, the Jonval turbines, which are, essentially, reaction-turbines, be taken as an example, it is known that they act most efficiently when the linear speed of rotation of the moving wheel taken at the center of the paddle-blades attains about seventy per cent. of the theoretical speed ($Vo = \sqrt{2g \cdot H}$) due to the height of the fall H by which the turbine is being driven, while with direct-action turbines—the Girard turbine, for example— maximum efficiency is attained with a speed of wheel equal to only fifty per cent. of the theoretical Vo. The same law applies to steam-turbines. If it be wished to decrease the speed of rotation, which is always the case in these kinds of engines, there is advantage in using direct-action and not reaction turbines.

Second. In reaction-turbines the difference of pressure which exists between the two faces of the moving wheel necessarily causes a longitudinal thrust upon the shaft. Special precautions must therefore be taken to equalize this thrust. When the turbine is driven by direct action, this thrust no longer takes place, whereby its construction may be substantially simplified.

Third. The difference of pressure upon the two faces of the moving wheel causes leakage of driving fluid by reason of the play necessarily existing between the moving and fixed parts. It is therefore necessary to reduce this play as much as possible, which entails great care in construction. In spite of everything the leakages in reaction-turbines with a fluid as penetrating as steam are very serious. On the other hand, a play of only two to three tenths of a millimeter will probably cause after slight wear of the bearings contact and friction between the fixed and the rotating parts, which is in practice a very great defect.

Fourth. In reaction-turbines the driving fluid should act upon the whole extent of the circumference of the moving wheel. This is necessary, because otherwise the moving channel in the wheels will be subjected to sudden variations in pressure, according as they are or are not facing the distributers. Therefore in multiple-wheel turbines, in the first wheels at any rate, the blades must be very short and the wheel of very small diameter. With direct-action turbines, on the contrary, there is no difficulty in making the steam act upon a portion only of the circumference of the moving wheel. The diameter of the wheels and also the moving paddle-blades and the fixed blades may therefore be as is most suitable.

The above statements show the advantage of direct-action turbines over reaction-turbines. We will now describe the different parts of the apparatus which form the object of the present invention.

The nature and scope of our invention will be more fully understood from the following description, taken in connection with the accompanying drawings, forming part hereof, in which—

Figures 1, 2, 3, and 4 are vertical sectional views of varying forms of construction of the turbine-wheels embodying main features of our invention. Fig. 5 is a front view of one of said wheels. Figs. 6, 7, 8, and 9 are detail views illustrating two ways of securing the blades to the rim of the wheels. Figs. 10, 11, 12, 12ª, and 13 are views illustrating in detail varying forms of construction of the fixed steam-distributers and their diaphragms. Fig. 14 is a longitudinal central sectional view of a multicellular turbine embodying our invention. Fig. 15 is a cross-sectional view illustrating the manner of mounting the distributers. Fig. 16 is a diagrammatic view illustrating the arrangement of the distributers in steps. Fig. 17 is a diagrammatic view showing the manner of coupling multicellular turbines in the driving of two electrical machines or dynamos, and Fig. 18 is a diagrammatic view illustrating a multicellular turbine adapted to be operated either with or without condensation.

Referring to the drawings, 1, 2, 3, and 4 show different constructions of the rotating disks of sheet-iron or of other metal. 1 and 2 are conical disks. The piece or disk 1 has its periphery bent or flanged into U shape in cross-section. It is riveted or otherwise secured at its center to the hub 5. The U shape considerably increases the strength of the disk. The disk 2 is conical and has riveted to its periphery an annular flange which in cross-section is U shape. It is also riveted at its center to the hub. The disk 3 is flat and has on its periphery an annular rim, bent to a U shape in cross-section. The disk 4 is flat and has riveted to its periphery an annular angle-piece, which is U shape in cross-section.

The paddle-blades 6, upon which the jet of steam impinges, are riveted to the annular U-shaped rim or periphery of the moving disks.

Fig. 5 is a front view of the different forms of moving disks.

The construction of the paddle-blades is shown in Figs. 6, 7, 8, and 9.

Each paddle-blade 6, of raised sheet metal, is fixed at its lower portion by a rivet 7 to the periphery of the disk.

Fig. 7 shows the method of fixing two successive paddle-blades to the periphery of the disk, in which, in order to strengthen the paddle-blade, metal is cast upon its lower angle-piece 8. The moment of inertia of the paddle-blade is therefore increased, and it is able to resist the thrust of the steam without flattening. Figs. 8 and 9 show a slightly-different construction of moving paddle-blades.

The paddle-blade 9 is attached to the periphery of the disk by the rivet 7, and the outer periphery of said blade is attached to a felly 10, formed of a metal strip. This felly is pierced with holes, through which the thinned end of the moving paddle-blade to be riveted to the felly passes. The lower angle 8 of each of the paddle-blades is always filled with cast metal, as shown in Fig. 9. This method of construction has the advantage of considerably increasing the strength of the blades, thus permitting them to resist great centrifugal forces.

Figs. 10, 11, 12, 12ª, and 13 show two constructions of distributer. The distributers are formed of stationary blades 11, 12, or 15, which are fixed to a metal diaphragm 13 or 14. The arc embraced by the distributers increases from the first distributer on the left to the last distributer on the right in proportion as the steam expands, Fig. 16. In Fig. 10 the distributer 11 only occupies a small arc, as also does 15 in Fig. 12ª. In Fig. 12, however, the distributer 12 occupies, on the contrary, the whole of the periphery. The diaphragm which supports the distributer is formed in Fig. 11 of a single conical piece 13 and is fixed to a hub 16, through which the shaft of the turbine passes, allowance being made for a slight play. The diaphragm in Fig. 13 consists of a flat disk 14 in a single piece strengthened by ribs. It is also fixed to a hub 17, through which the shaft of the turbine passes, allowance being made for slight play.

Fig. 14 is a vertical section of the turbine, showing the method of fixing the distributers and their diaphragms. Each diaphragm is inclosed by the cylindrical casing of the turbine. The latter is provided at both ends with two conical end pieces 19 and 20.

21 is the shaft of the turbine.

22 is the steam-inlet.

23 24 are the two first moving disks of small diameter.

25 26 are the two following disks. The number of these disks varies according to the power of the machine.

27 is the first steam-distributer and is fixed in the end piece 19 of the turbine.

28 is the second distributer, and its diaphragm has the conical shape shown in Fig. 11. The periphery of the disk forming the distributer and diaphragm is surrounded by the casing of the turbine. The two distributers, whose diaphragms 29 29 are of larger diameter, are also surrounded by the casing of the turbine. A turbine on this system may be formed of any suitable number of wheels and distributers, which may be of any suitable size.

30 30 30 are plates riveted upon the rear portion of the diaphragms in such a manner as to give them a smooth surface, which considerably diminishes the friction due to dead steam.

31 is the bearing supporting the shaft.

32 is the bearing placed at the condenser side.

33 represents the bolts joining the two separate halves of the casing 18.

34 is the outlet or exhaust orifice for the steam to pass out into the condenser.

The multicellular construction of the turbine reduces the leakage of steam to very small dimensions, for the steam expands by a succession of falls of pressure produced in each distributer. Each moving disk being inclosed between two diaphragms rotates in an inclosed space in which the pressure is uniform, because the turbine is, as above explained, a positive-action turbine. There is therefore no leakage of steam from one face of the moving disk to the other, and consequently the steam which passes out from a distributer into the chamber of a moving disk is entirely utilized in speed. The only leakage of steam there can be is through the diaphraghm of each distributer, and the diaphragm being fixed is exposed to the difference in pressure resulting from the fall of pressure in the steam. The steam has therefore a tendency to pass from one face of the diaphragm to the other through any orifices there may be. Besides the distributer-orifices the only orifice remaining consists in the space left between the hub of the diaphragm and the turbine-shaft. This space may be reduced to very small dimensions when constructed properly, and the leakage of steam will be very small. In a reaction-turbine the leakage of steam takes place throughout the periphery of the distributer and is consequently larger.

Fig. 14 shows how the turbine should be erected. The moving disks and also the fixed diaphragms are placed one after the other upon the shaft of the turbine. The shaft thus fitted is placed in its bearings, the diaphragms fitting into recesses in the lower half of the casing. It is then covered in by the upper half of the casing, and the bolts 33 are screwed up, thus connecting the two halves of the casing together.

Fig. 16 shows the development of a cylindrical section through the axis of the distributers and the moving blades in Fig. 14. This figure is for the purpose of showing how the distributers are situated with respect to the diaphragms.

As will be seen, the different distributers, which successively increase in size, are not arranged opposite one another, but in steps. They thus form a spiral in space. Their centers are ranged one before the other, as shown by the dotted line $a\,b\,c\,d\,e\,f\,g\,h$. This method of arranging the distributers has for its object to utilize the speed of the steam passing out of the moving wheels. Each time that the steam acts upon a wheel it describes a small arc upon the cylindrical periphery of the turbine in advancing from left to right in the direction of the axis. The residual speed of the steam passing out from the moving wheel is still very considerable. If this is not to be lost, there must be opposite the spot at which the steam passes out from the moving wheel a distributer into which it can at once pass. If, on the contrary, a fixed partition—that is to say, the space between two distributers—faces this spot the outlet speed is neutralized by the impact and the eddies created by the impact. It will thus be seen that the distributers should be arranged in steps from left to right.

The dotted line $a\,b\,c\,d\,e\,f\,g\,h$ shows approximately the mean path of the steam entering at $a$ into the first moving wheel.

The first moving wheel of the turbine is only partially supplied with steam; but as the pressure falls expansion enormously increases the volume of steam. The moving wheels are then kept fully supplied with steam—that is to say, the different portions of the distributers are contiguous and occupy the entire circumference. In order to facilitate expansion, it is preferable to increase the height of the moving blades and to vary the angle at which the steam passes into and out of the blades of the distributer.

Fig. 17 relates to the use of steam-turbines for driving electrical machines at high speed. It is possible to construct turbines of four thousand and five thousand horse-power having a speed of fifteen hundred rotations per minute. Under these conditions there may be cases in which it would be inconvenient to absorb this power by a single electric machine. It would therefore be preferable to divide the turbine into one or more parts mounted on different shafts. Continuous-current or alternating-current generators are then coupled in parallel. The work rendered by the series of turbines remains the same as with a single turbine. A single regulator for admitting steam into the first turbine is generally sufficient to regulate the whole series, the speed of rotation of the different shafts remaining the same. Dynamos coupled in parallel regulate one another, particularly when alternators are in question. The problem of coupling in parallel is therefore much simplified, as the influence of variation of the motor-couple which always exists in piston-engines is entirely avoided in steam-turbines, in which the flow of steam is continuous and the motor-couple constant.

Fig. 17 shows a group of two turbines 35 36 arranged in series and driving two alternators 37 38, coupled in parallel. Steam passes in through the pipe 39, passes through the obturator 40, controlled by a regulator 41, and from thence it passes into the first moving wheel to the left of the turbine 35, passes out of this turbine through the pipe 42 into the turbine 36, from whence it passes out through the pipe 43 into the condenser.

A speed-regulator is not absolutely necessary for the working of the turbine 36. The drawings, however, show a regulator in connection with this turbine, it being merely for the purpose of regulating when the turbine 36 is driven by itself.

In order that the turbine 36 may be driven by itself, it is merely necessary to close communication with the turbine 36 through the cock 44 and to open communication with the steam-generators through the cock 45. The pipe 46 leads steam directly from the boiler to the turbine 36.

Instead of placing the turbines 35 and 36 upon different shafts they could be placed upon the same shaft with an intermediate bearing between the two. In this case it is preferable to retain the feed-pipe 46 of the second turbine 36. This pipe allows results to be obtained which are useful and will be indicated later.

First, by leading steam directly from the boilers to the turbine 36 without it passing through the turbine 35 the amount of steam utilized by the turbines may be increased and greater power obtained. This result is important when the turbines have been arranged to work with condensation and they are temporarily worked with free outlet into the atmosphere. The consumption of steam with free outlet into the atmosphere being greater for the same power of machine, it is necessary to cause a larger amount of steam to be delivered; but the size of the distributers of the turbine 35 cannot be increased, as it is constructed for a constant delivery of steam under a given pressure. It is therefore impossible to deliver a larger quantity of steam through the turbine 35. The extra steam consumed must therefore be distributed to the turbine 36. This result may be attained by means of the pipe 46. This portion of our invention above described, and illustrated in Fig. 17, forms the subject-matter of an application to be filed by us as a division of the present application for a patent.

Secondly, it may also be necessary in certain cases to temporarily give to the engine a power greatly in excess of its maximum normal power. As the size of the passage in the first distributer is such as to obtain the greatest power with the pressure given by the generator, there is no other method of increasing the power than by causing steam to pass in at another portion of the turbine. Fig. 18 shows an arrangement of this nature. The pipe 47 leads steam from the generator to a turbine 48 through a cock 49. Steam passes into the first distributer through the pipe 50. The pipe 47 is connected with another pipe 51, which leads steam in at a point farther up the turbine, the steam first passing through the cock 52. With this construction, therefore, a distributer at 51 can be supplied directly from the boiler—that is to say, a distributer whose section is much greater than that of the first distributer. It is therefore possible to greatly increase the power of the apparatus by causing a greater quantity of steam to pass into the apparatus. The effect indicated is the same as would be obtained in a piston-engine by increasing the admission to the first cylinder. The pipe 46 in Fig. 17 and the pipe 51 in Fig. 18, which are for the same object, allow low-pressure exhaust-steam from turbines or piston-engines to be introduced into the turbine. This exhaust-steam continues to expand in the portion of the turbine in which it acts and does work efficiently.

Having thus described the nature and object of our invention, what we claim as new, and desire to secure by Letters Patent, is—

1. A multicellular turbine, comprising a shaft, a casing inclosing said shaft, a series of moving wheels arranged within the casing and secured on said shaft, a series of paddle-blades projecting from the periphery of each wheel, a series of membranes projecting from the casing and forming the walls of separate chambers wherein the wheels may revolve, said membranes surrounding the shaft some distance away from the connections between the shaft and moving wheels and distributers arranged in the membranes to direct the motive fluid directly upon the paddle-blades, and said distributers increasing in width and overlapping each other successively at one end and not at the other.

2. In a multicellular turbine, wherein the moving disks or wheels are each subjected to the direct action of the motive fluid in a separate steam-chamber, a disk or wheel consisting of a body or plate united to a central axis or hub, the periphery of the plate being U-shaped in cross-section, in combination with a series of paddle-blades united directly to the periphery of said disk, substantially as and for the purposes described.

3. In à multicellular turbine of the type described, a moving disk or wheel comprising a central body portion united to a central axis, and having an annular rim or periphery substantially U shape in cross-section, in combination with a series of angular pieces or paddle-blades, united to and projecting from the rim of the disk, a strengthening-piece cast or otherwise united to the paddle-blades at the angle thereof and a metallic felly concentric with the rim of the disk and firmly united to the projecting portions of the angular paddle-blades.

4. In a multicellular turbine of the type described, a steam chamber or cell formed by the outer casing of the turbine and two adjacent membranes, each of said membranes being formed of a single piece, mounted upon the central axis of the turbine and having the periphery interlocking with a groove formed in the interior wall of the casing.

5. In a multicellular turbine, wherein the wheels are actuated by live motive fluid expanding against the periphery of each wheel successively, a series of separated chambers or cells wherein the wheels are arranged to revolve, said cells formed by the exterior casing of the turbine and a series of fixed membranes projecting from the casing to inclose between adjacent membranes each of said wheels, in combination with a series of distributers for the motive fluid penetrating each chamber or cell, said distributers growing in section from the first to the last chamber or cell to overlap each other successively at one end and not at the other and arranged so that the motive fluid in one cell may expand against the periphery of the wheel in that cell and thereafter pass helically through a succeeding distributer into the next cell without obstruction.

6. In a multicellular turbine wherein the wheels are normally actuated by the expansion of live motive fluid through each successive cell and against the periphery of each succeeding wheel, a means for augmenting the power of said turbine, said means consisting of a pipe conveying live motive fluid to a cell intermediate in the series of cells.

7. A multicellular turbine, comprising an incased shaft, a series of wheels arranged within the shaft-casing, a series of paddle-blades projecting from each of said wheels, a series of membranes forming the walls of separate chambers, wherein said wheels are adapted to revolve and distributers arranged to direct motive fluid upon said paddle-blades, said distributers increasing in width and overlapping each other successively at one end but not at the other.

8. In a multicellular turbine, wherein movable disks or wheels are each subjected to the direct action of motive fluid, in a separate steam-chamber, a disk or wheel consisting of a body or plate united to a central axis or hub, in combination with a series of paddle-blades united directly to the peripheries of said disks or wheels.

9. In a multicellular turbine, a movable disk or wheel, comprising a central body united to a central axis and provided with a rim, in combination with a series of paddle-blades united to and projecting from the rim of said disk or wheel, a strengthening-piece united to each paddle-blade and a felly united to the projecting portions of said blades.

10. In a multicellular turbine, a chamber or cell formed by the casing of the turbine, two membranes, each consisting of a single piece mounted on a central axis of the turbine, and interlocking with the wall of said casing.

11. In a multicellular turbine, wherein the wheels are actuated by live motive fluid expanding against each wheel successively, a series of chambers or cells, wherein the wheels are adapted to rotate, said chambers or cells formed by the casing of the turbine, a series of membranes projecting from the casing to inclose between adjacent membranes, each of said wheels, in combination with a series of distributers for the motive fluid penetrating each chamber or cell, said distributers arranged to overlap each other at one end but not at the other so that the motive fluid of one cell may expand against the wheel in that cell and then pass through a succeeding distributer into the next cell, without obstruction.

12. In a multicellular turbine of the type described, a casing formed into two halves, a steam-chamber or cell formed by said casing, and two adjacent membranes, each formed of a single piece mounted upon the central axis of the turbine and having a periphery interlocking with said casing.

13. In a multicellular turbine of the type described, an outer casing formed in two halves, divided diametrically, a steam chamber or cell formed by said casing and two adjacent membranes, each formed of a single piece mounted upon the central axis of the turbine, and having a periphery interlocking with a groove of said casing.

In testimony whereof we have signed this specification in the presence of two subscribing witnesses.

AUGUSTE CAMILLE EDMOND RATEAU.
  GASTON SAUTTER.

Witnesses:
  PAUL DE MERTSAL,
  EDWARD P. MACLEAN.